T. F. FRANK.
Coffee Pot.
No. 90,835.
Patented June 1, 1869.
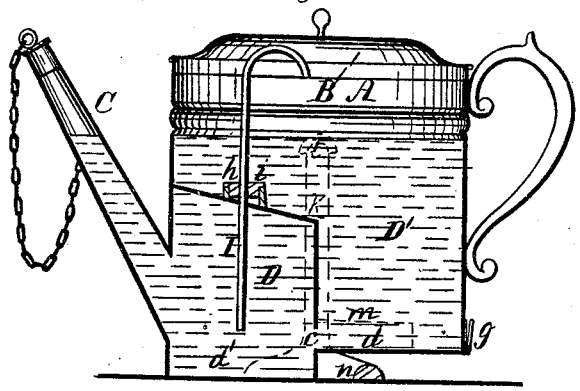
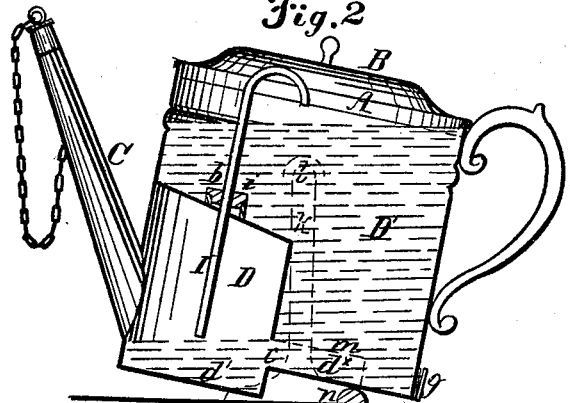
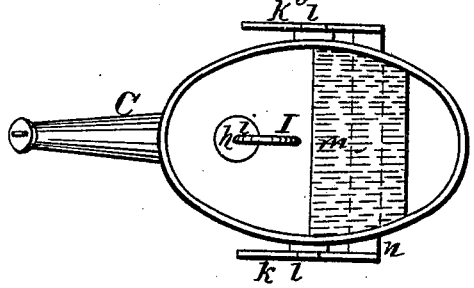
Witnesses:
Edward Whiting
P. H. Becker.
Inventor;
T. F. Frank
by Forbush & Hyatt
Attys.

United States Patent Office.

THEODORE F. FRANK, OF BUFFALO, NEW YORK.

Letters Patent No. 90,835, dated June 1, 1869.

IMPROVEMENT IN TEA AND COFFEE-POTS.

The Schedule referred to in these Letters Patent and making part of the same.

*To all whom it may concern:*

Be it known that I, THEODORE F. FRANK, of the city of Buffalo, in the county of Erie, and State of New York, have invented a certain new and useful Improvement in Tea and Coffee-Pots; and I do hereby declare that the following is a full and exact description thereof, reference being had to the accompanying drawings, in which—

Figure I is a central vertical section of my improved pot, represented in a vertical position.

Figure II is a similar section, with the pot shown inclined.

Figure III is a plan, with the lid removed.

Like letters of reference designate like parts in each of the figures.

My present invention is designed as an improvement on that for which Letters Patent, No. 86,522, were granted to me, February 2, 1869, of which original invention the following is a description of so much thereof as is necessary to a proper understanding of this improvement.

The principal object of the original invention was to prevent the excessive boiling of the contents of a tea or coffee-pot, and the consequent escape of the steam into the apartment, and the loss of the aroma, and resulting deterioration in the quality of the beverage.

The first feature of the invention consisted of a tea or coffee-pot, divided vertically into two chambers, communicating with each other at the bottom, with the base of one removed from contact with the heating-surface, and so pivoted to a suitable frame, at or near its centre of gravity, that the generation of steam in the one chamber will produce a displacement of the liquid into the other, and a change in the centre of gravity of the pot, while the latter, in seeking to restore its lost equilibrium, gradually turns on its pivot, and automatically removes the bottom away from the heating-surface, and checks ebullition, the condensation of the steam permitting a reflux of the liquid, and a return of the pot to its first position.

In the accompanying drawings—

A is the pot;
B is the lid;
C is the spout; and
D D' the two chambers thereof, an opening, e, being left at the bottom of the partition separating the two chambers, to permit the passage of the liquid from one to the other.

An opening, h, is left in the top of the compartment D, which is closed by a stopper, i, or equivalent.

m is a perforated plate arranged over or before the opening e, to prevent the passage of the coffee beneath the partition into the chamber D.

The base of the pot is made with a jog or rebate, as shown, so that the bottom d', of the chamber D, will be removed from contact with the heating-surface beneath.

K K are two standards connected by a cross-bar, n, and resting on top of the stove or furnace, for supporting the pot, which is pivoted, at or near its center of gravity, between the two standards, as shown at l. The rebate at the bottom of the pot should be formed at such a position that the center of gravity, or a perpendicular line dropped from the pivots l, will fall just within the portion d of the base.

The operation of the before-described and already-patented improvements, is as follows:

The tea or coffee, from which the beverage is to be prepared, is placed in the bottom of chamber D', and the required amount of water supplied to the pot. The end of the spout is then closed by a plug or other suitable means, and the lid shut. The pot being placed in this condition on the stove, the generation of steam in the compartment D causes a displacement of water therefrom, which, rising in the vessel D', causes a preponderance in the latter chamber, which produces a swinging of the pot on its axis l, that removes the portion d of the bottom away from the heating-surface, as shown in Fig. II, and checks ebullition.

The back of the pot, below the handle, is provided with a hinged leg, g, which is turned up out of the way during the preparation of the beverage, but which can be turned down, so as to prevent the accidental tipping or inclination of the pot, when it is removed from the frame.

This pot, which operated finely on a stove of moderate temperature, I found to be deficient in one particular: when the heating-plate in which the pot rested, was raised to a higher temperature. In such case the heat of the stove would be sufficient to continue the generation of steam in the chamber D, after the bottom d was removed from contact with the stove, increased pressure of the steam confined in the chamber D, continuing to displace the water therein until it was depressed to a point level with the passage e between the two chambers, when the steam would escape through this opening into the chamber D', through the coffee, causing ebullition to take place in that chamber.

The object of my invention is to prevent this result, and the invention consists in the arrangement of a small pipe within the chamber D, opening up through the top thereof, the lower end descending within the chamber to a point a little above the level of the opening e, so as to permit the escape of the steam through said pipe into the top of the pot, when the liquid in chamber D is depressed beneath its lower end, thereby relieving the latter chamber and permitting a reflux of the liquid therein.

In the drawings, I represents this pipe, which preferably passes upward through the stopper i, and terminates near the top of the pot. It may, however, be differently arranged, and terminate immediately above the top of chamber D, the operation of the device for being obviously the same. The arrangement of the pipe so as to pass through the stopper, enables it to be removed with the latter, when required in rinsing out the vessel.

By means of this improvement, the steam escaping through the pipe I, above the liquid, is condensed in the upper and cooler portion of the pot without imparting its heat to the coffee and liquid in the chamber D', as it would were it permitted to pass through the opening e, which it would do, were no such means provided.

What I claim as my invention, and desire to secure by Letters Patent, is—

An oscillating coffee-pot, of the general construction herein shown, having the chambers D D', pipe I, and passage e, arranged as described, and for the purpose shown.

T. F. FRANK.

Witnesses:
  J. HYATT,
  OSCAR W. ALLISON.